United States Patent [19]

Lemmens

[11] Patent Number: 5,067,370
[45] Date of Patent: Nov. 26, 1991

[54] VARIABLE CRANK PEDAL DRIVE FOR BICYCLES AND THE LIKE

[76] Inventor: Joseph R. Lemmens, 6208 Sandy Forks Rd., Raleigh, N.C. 27615

[21] Appl. No.: 365,541

[22] Filed: Jun. 13, 1989

[51] Int. Cl.⁵ .............................................. G05G 1/14
[52] U.S. Cl. .................................. 74/594.2; 74/594.3; 474/63; 474/152
[58] Field of Search .......................... 74/594.1–594.3; 474/69, 70, 152

*Primary Examiner*—Vinh T. Luong

[57] ABSTRACT

A drive system for driving any driven device, such as the rear wheel of a bicycle or the like, comprising a pair of oppositely-directed input torque crank arms supported for independent rotation about a first axis, an output torque member supported for rotation about a second axis parallel to and spaced from the first axis, and torque transferring linkages connecting both crank arms to the output torque member. The angular orientation of the plane containing the two axes adjustable and the amount of eccentricity may be fixed or adjustable. The arrangement is such that for a constant speed of the output member, each input crank arm will undergo a single speed variation per revolution. Typically, from its top dead center position to its bottom dead center position, the angular velocity of each crank arm decreases and then increases in the second half-turn.

7 Claims, 4 Drawing Sheets

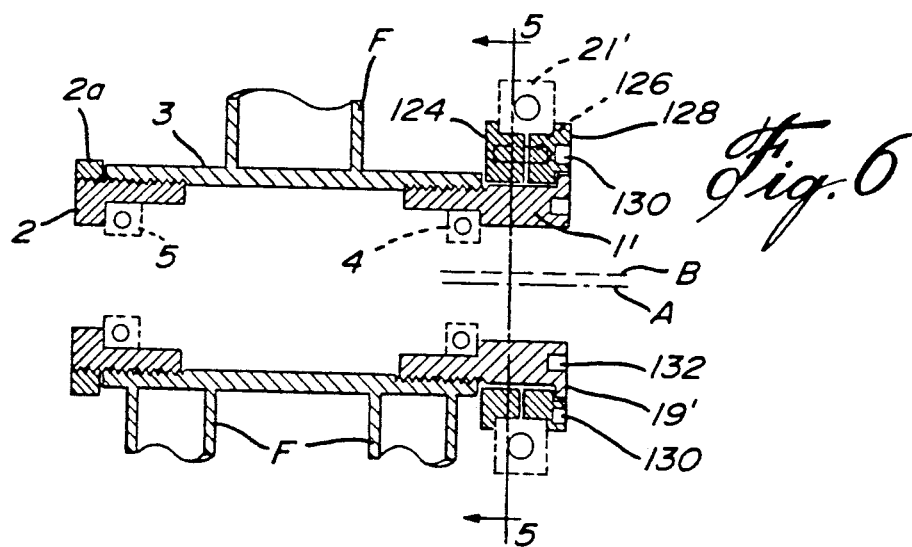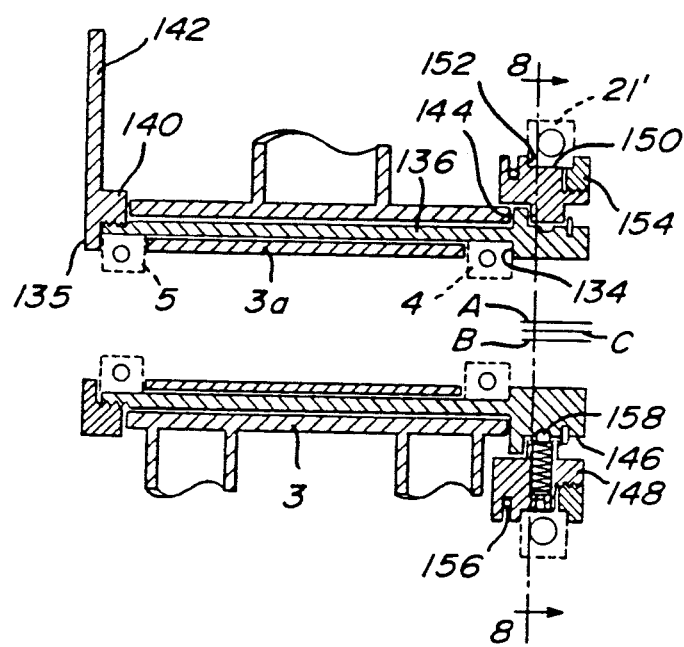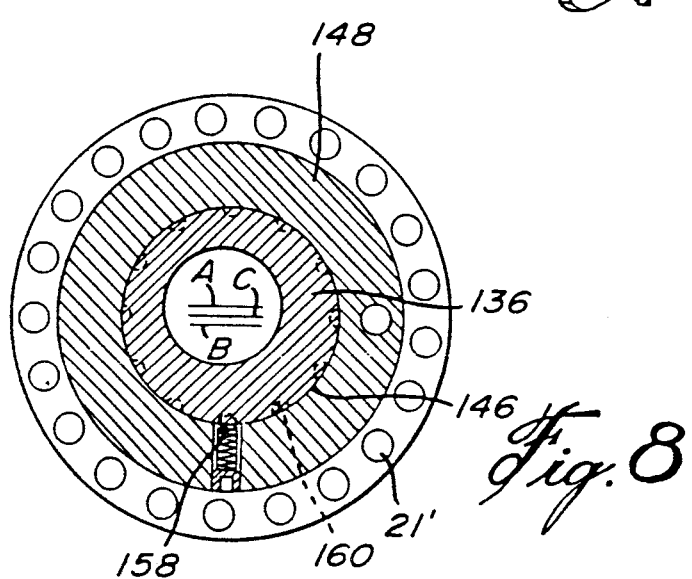

VARIABLE CRANK PEDAL DRIVE FOR BICYCLES AND THE LIKE

FIELD OF THE INVENTION

The present invention relates to a drive system for bicycles and other apparatuses.

DESCRIPTION OF THE PRIOR ART

Over the years, several bicycle drive systems have been built in trying to improve their matching with the cyclist's legs during pedaling. Oval or elliptrical chain rings have been proposed, but the resulting double variation of pedaling speed per revolution forces the cyclist to make a push-pull pedaling motion which disturbs the pedaling rythm, which feels clumsy and which prevents efficient pedaling, especially at a crank speed of 80 to 120 r.p.m. If the ovality of the chain ring is minimized, in order to permit the above-noted pedaling cadence, then the potential advantage of an oval chain ring is highly reduced.

United Kingdom Patent Number 16214 dated Sept. 11, 1897 to Alfrid Mason a described bicycle drive system which tries to optimize the pedaling motion. However, the system is very complex, heavy, not compact, expensive to manufacture and do not have an efficient gearing.

Therefore, there is need for a simple, efficient and improved bicycle drive and which would be an improvement over the circular and non-circular chain ring.

OBJECTS OF THE INVENTION

It is therefore the general object of the present invention to provide a drive system for bicycles and other apparatuses in which the crank arms have a variable speed, there being a single speed variation per revolution.

Another object of the present invention is to provide a drive of the character described, in which each of the oppositely-directed crank arms progressively increases its speed over one-half revolution and then progressively decreases its speed over the second half revolution.

Another object of the present invention is to provide a drive system of the character described, in which the amount of speed variation can be adjusted, and also the angular orientation of the zone of maximum crank arm speed can be adjusted, so as to suit various types of cyclists and training requirements.

Another object of the present invention is to provide a bicycle drive system of the character described, which can be easily fitted to existing bicycle bottom brackets.

Another object of the invention is to provide a drive system for bicycles which allows the rider to pedal faster during the forward stroke; then slowing down during the down stroke, thus allowing the rider to transfer the inertia of his legs into usable power.

Another object of the present invention is to provide a drive system of the character described, which is efficient and of low cost and long-lasting construction.

SUMMARY OF THE INVENTION

The drive system of the invention is designed for bicycles and similar apparatus and comprises a support, a pair of oppositely-directed input torque crank arms supported by the support for independent rotation about a first axis, an output torque member supported by said support for rotation about a second axis parallel to and spaced from the first axis and torque-transferring linkage means connecting each crank arm to said output torque member. For a constant rotational speed of the output torque member, each crank arm will successively undergo a similar single speed variation per revolution. When the drive system is applied to a bicycle, the support is the bottom bracket of the bicycle frame and pedals are secured to the outer ends of the crank arms. The output torque member consists of the chain ring support of the bicycle.

The system further includes means to adjust the angular orientation of the plane containing the two axes. Means are also preferably provided to adjust the spacing between the two axes when such a need is required or advantageous.

Different embodiments are illustrated and described.

BRIEF DESCRIPTION OF THE DRAWINGS

In the drawings:

FIG. 6 is a longitudinal section, of a portion of the bottom bracket which could be used in an embodiment similar to that of FIG. 1;

FIG. 7 is a longitudinal section, of still another embodiment of a bottom bracket which could be used with FIG. 1, where a double-eccentricity system is used to vary the eccentricity of the chain ring and, consequently, to adjust the amount of velocity variation of the crank arms; and FIG. 8 is a cross-section along line 8—8 of FIG. 7.

BRIEF DESCRIPTION OF THE PREFERRED EMBODIMENTS

Figure 1:
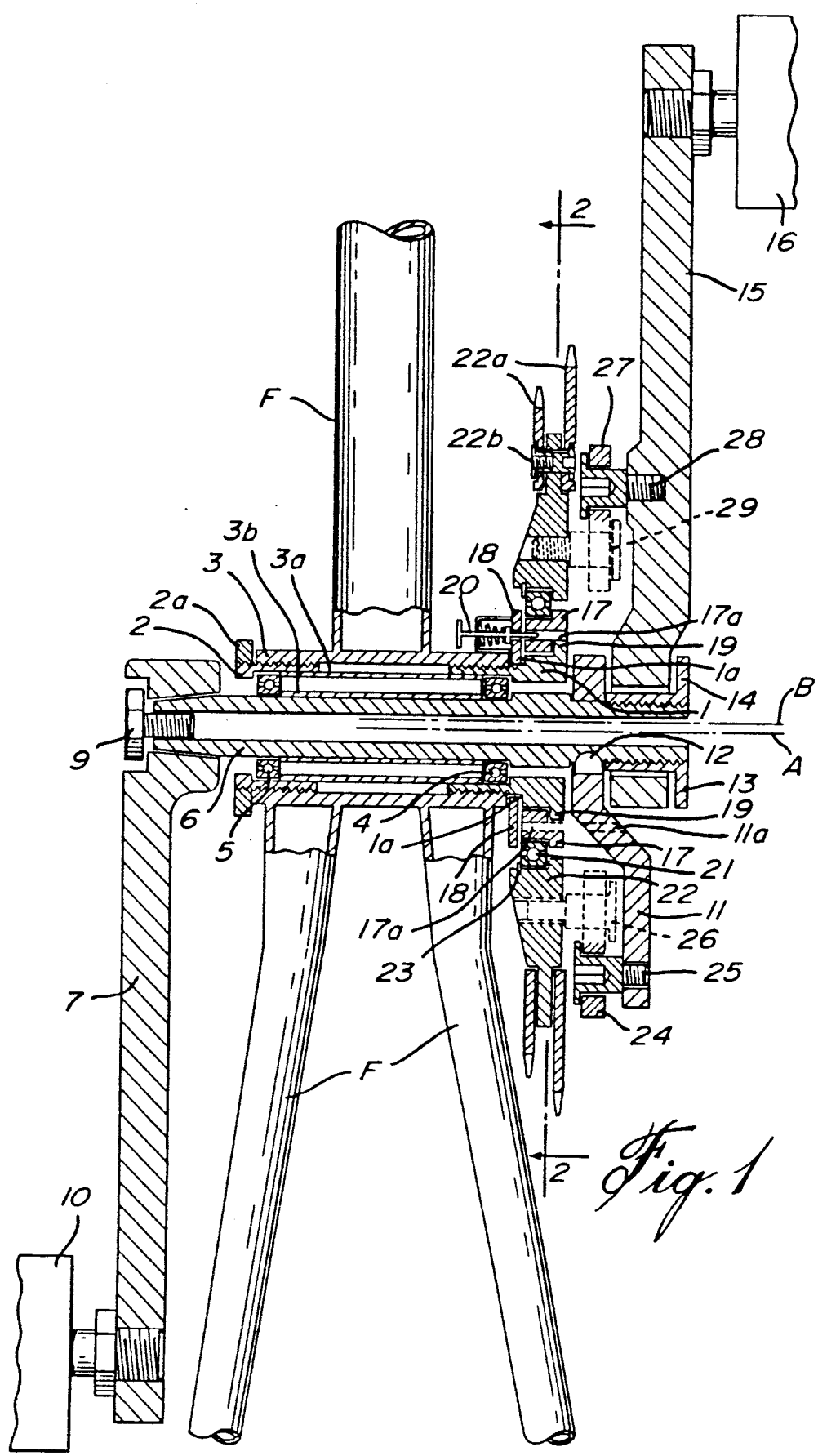
FIG. 1 is a cross-sectional view of a crank set in accordance with the first embodiment of the invention.
Figure 2:
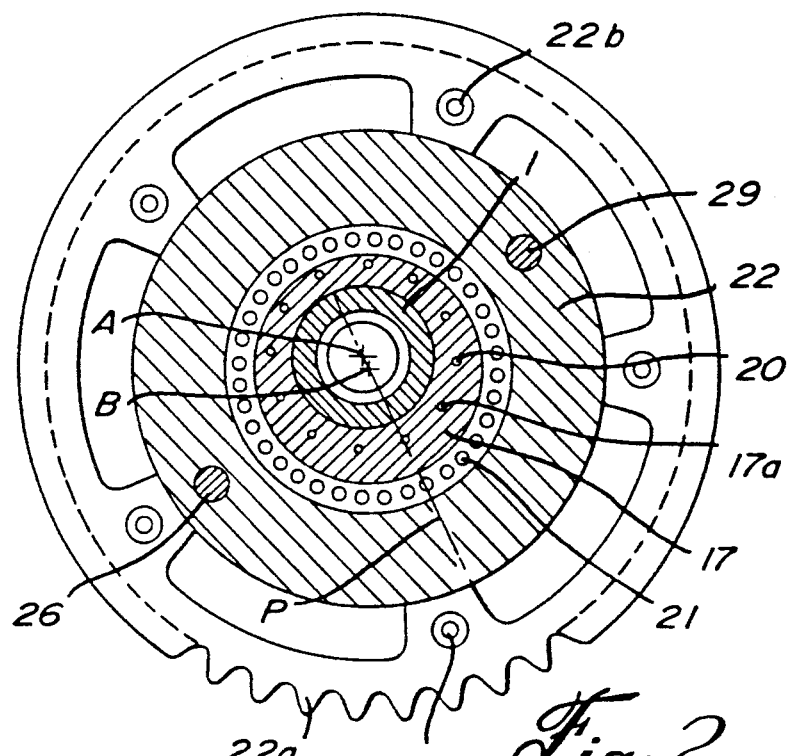
FIG. 2 is a plan section taken along line 2—2 of FIG. 1.
Figure 2A:
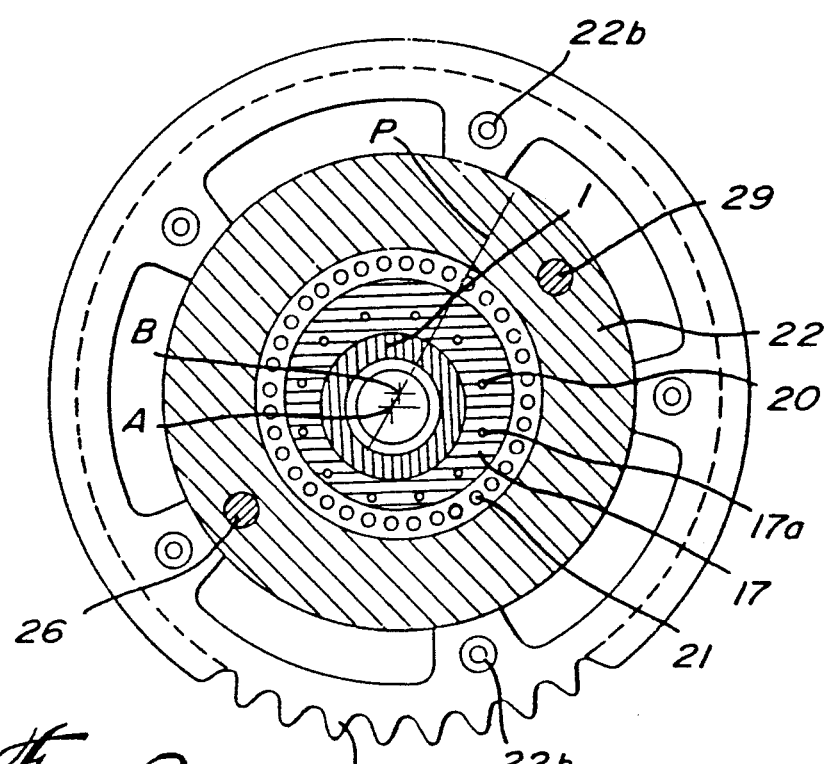
FIG. 2a is a view similar to FIG. 2 but showing the excentric collar in another adjusted rotated position.
Figure 3:
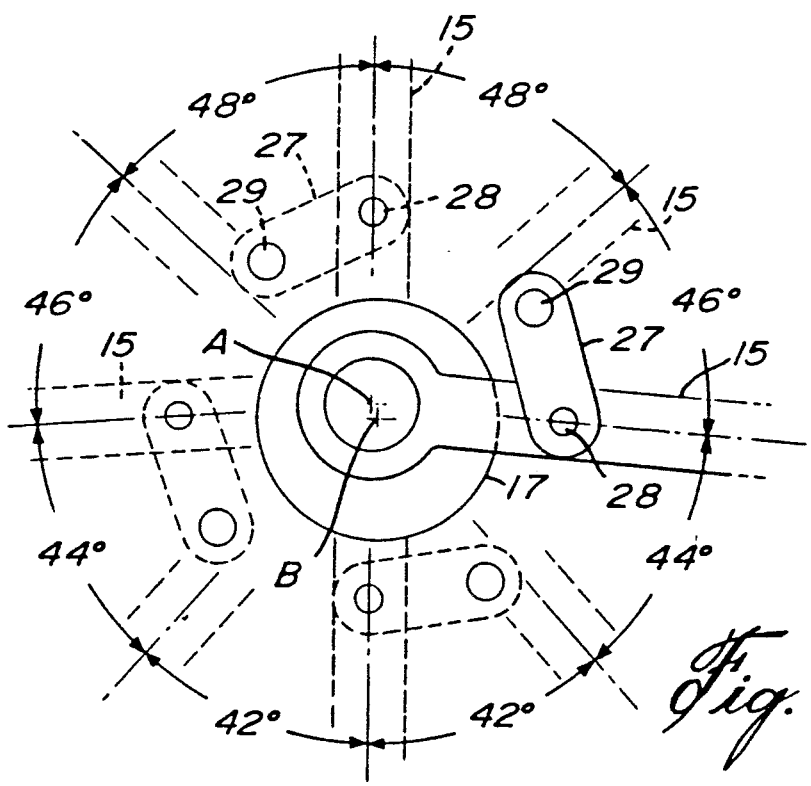
FIG. 3 is a diagram showing the motion of one pedal-carrying crank arm in degrees for each consecutive 45-degree rotation made by the torque output member or chain ring.

Referring to FIGS. 1 to 3 inclusive, there is shown a first embodiment in which two threaded bearing supports 1 and 2 are conventionally screwed within a cylindrical conventional bottom bracket 3 of a bicycle frame F, this bottom bracket 3 normally carrying a standard pedal crank set. The bearing supports, together with a sleeve 3b press fitted on a crank shaft 6 and a spacing sleeve 3a, are arranged to locate the bearings 4 and 5, which in turn rotatably support the crank shaft 6 for free rotation about a crank arm axis A. Bearing support 2, once adjusted, is locked by a lock nut 2a.

A crank arm 7 is firmly secured to the square taper engagement end 8 of the crank shaft 6 by means of a securing bolt 9 and carries a pedal 10 at its outer end. A transfer arm 11 is fixed to the opposite end of the crank shaft 6 by means of a locking key 12. Transfer arm 11 has the same angular orientation as crank arm 7, relative to crank that is both lie in a plane containing the crank shaft 6.

A flanged bolt 13 is screwed to the crank shaft 6 adjacent transfer arm 11 and rotatably supports a crank arm 15 with the intermediary of anti-friction material 14. Crank arm 15 is directed opposite to crank arm 7. It carries at its outer end a pedal 16. Crank arm 15 is free to rotate around flanged bolt 13 about the crank arm axis A.

An eccentric collar 17 is mounted for free rotation on the support 1 adjacent the transfer arm 11 being located between and axially restrained by a washer 18 and by an outer flange or rib 19 of support 1. Washer 18 is tightened between the bottom bracket 3 and a step 1A of the bearing support 1 as the latter is screwed within bottom bracket 3. Washer 18, which cannot rotate, carries a spring-loaded plunger 20 which is engageable into any selected indexing hole 17a of the eccentric collar 17 to adjustably lock the same in rotated position. Eccentric collar 17 supports, by means of a bearing 21, a chain ring support 22 for free rotation of the latter about a chain ring axis B which is parallel to and spaced from the crank arm axis A. The spacing between the two axes is obviously a function of the eccentricity of the collar 17. The chain ring support 22 is of conventional construction and carries, for instance, two chain rings 22a of different diameters. The chain ring support 22 is firmly retained on the bearing 21 by a snap-ring 23. Parts 22 and 22a collectively define an output torque wheel.

From the foregoing, it follows that the crank set formed by the two crank arms 7 and 15 and their pedals 10 and 16, rotate about a first axis A, while the chain rings rotate about a second axis B. Obviously, the drive is connected to the rear wheel of the bicycle by means of a chain, not shown.

A first link 24 is pivotally connected to the outer end of transfer arm 11 by means of a shoulder bolt 25 and to the chain ring support 22 by means of a shoulder bolt 26. Similarly, a link 27 is pivotally connected to the crank arm 15 by a shoulder bolt 28 and to the chain ring support 22 by a shoulder bolt 29. As above noted, the transfer arm 11 is in the same rotational position as crank arm 7. Shoulder bolts 25, 28 lie on the same circle of rotation. The same applies for shoulder bolts 26 and 29. Thus, the two links 24 and 27 may have the same length.

Referring to FIG. 2, it is seen that the excentric collar 17 has been rotated and locked into a position such that the rotational axis B of the chain ring support 22 is positioned below and slightly to the right of the crank arms rotational axis A as indicated by line P, which is the plane containing the two axes A and B. The same excentric collar position is shown in FIG. 3 wherein it is seen that each crank arm 7 and 15 will successively accomplish a variable speed revolution, supposing the chain ring support 22 rotates at a constant speed. More particularly, starting from the topmost position, for instance of crank arm 15, and in the clockwise direction of rotation, the arm 15 will move through 48 degrees for a 45-degree rotation of the chain ring support, and then will progressively slow down till the crank arm has reached its bottom position. In the other half revolution, the crank arm will progressively increase in velocity. The variation of velocity shown is based on an excetricity of one eighth of an inch and of an active length of 2 inches for the input crank arm and for the chain ring. The term active length defines the radius of the circles made by the shoulder bolts 25 and 28 of the input crank arms and by the shoulder bolts 26 and 29 of chain ring support 22 during their rotation. Generally speaking, the variation of velocity is basically proportional to the excentricity of collar 17 and inversely proportional to the active length of the input and output members.

Referring again to FIG. 3, it is shown that each pedal will successively move at a fastest average constant rate through the topmost quarter-turn; then progressively decreasing its velocity through the second quarter-turn reaching the slowest average velocity through the lowermost quarter turn and then progressively increasing its velocity through the fourth quarter-turn to reach maximum velocity at the top position.

With this arrangement, physiogically, it seems plausible that the fast push-forward with the leg (when moving through the topmost sector) then a decreasing speed during the down stroke with a relatively slower foot movement when pulled backward in the third sector, will be best adapted to the average cyclist.

Tests have shown that this is so: cyclists have achieved higher power, for instance, they can go uphill faster with a lower heartbeat, with slower breathing and with less fatigue and stiffness in the legs.

It was also found that the system can be used for cyclists' training by adjusting the rotated position of the eccentric collar 17. By pulling on the head of the plunger 20 (FIG. 1) to withdraw the same from the registering indexing hole 17A of collar 17, the latter can be rotated and then locked into another stationary position with the plunger 20 released and engaging under the bias of its spring another indexing hole 17A. Rotation of collar 17 can be effected by hand, preferably using a pin inserted into an exposed indexing hole 17A or by rotation of crank arm 7 or 15 after transfer arm 11 has been secured to collar 17 by the insertion of a pin through a through bore 11A of transfer arm 11 and a registering indexing hole 17A of collar 17. Rotating collar 17 through a predetermined angle obviously causes angular shifting through the same angle of the minimum and maximum velocity zones of the crank arms. For instance, if collar 17 (line P in FIGS. 2 and 3) is rotated clockwise through 30 degrees, the entire diagram of FIG. 3 will also angularly shifted clockwise through 30 degrees, and the maximum velocity zone indicated by the two 48-degree sectors no longer occurs at the top rotation sector of the crank arm.

Figure 4:
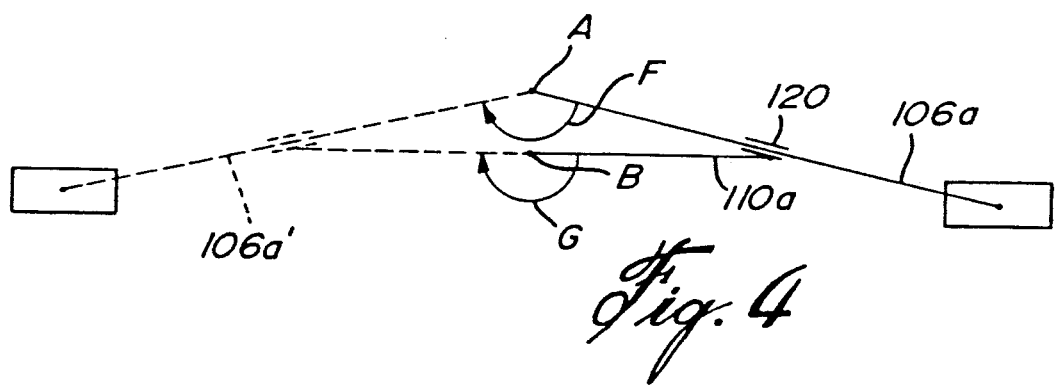
FIG. 4 diagrammatically illustrates the variation of velocity of one crank arm when rotating through 180 degrees: diagram applicable to the embodiments of FIGS 7 and 8.

FIG. 9 schematically illustrates, with an exaggerated excentricity, that the motion of the crank arm 106A of FIG. 8 through approximately 155 degrees about the crank arm axis A in the direction of arrow F, causes rotation of the torque-transfer arm 110a through 180 degrees about axis B, in the direction of arrow G. The link 24 is schematically indicated as a sleeve in FIG. 4. When crank arm 106A has reached the position 106'A, it will have to rotate through approximately a further 205 degrees about axis A to cause rotation of torque-transfer arm 110a through a second 180 degrees.

Figure 5:
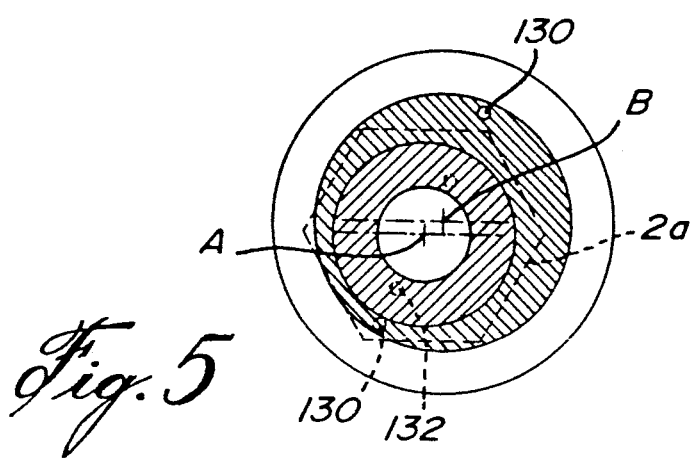
FIG. 5 is a cross-section taken along line 5—5 of FIG. 6.

FIGS. 5 and 6 show a further embodiment, which is very similar to the embodiment in FIG. 1. The bearings 4 and 5 support the same crank set as in FIG. 1, namely: the crank shaft 6 fitted with the crank arm 7 at one end, and at the other end with the transfer arm 11 and the crank arm 15.

A sleeve 3A would be interposed between the two bearings 4 and 5. On the left-hand side of the bottom bracket 3, the bearing 4 is held by the bearing support 2, as in the first embodiment, which is locked in position by the lock nut 2A. On the opposite side of the bottom bracket 3, the bearing 4 is held in position between the sleeve 3A and a bearing support 1', which carries on the outside thereof an excentric collar composed of two parts 124 and 126, which, when assembled by means, for instance of dowel pins 128, serve to maintain the inner race of a bearing 21', which serves to rotatably support the chain ring support 22 which carries the chain rings 22A, as in the first embodiment. The two-part eccentric collar 124 and 126 can be rotated to a particular indexed position by a suitable tool inserted into diametrically-opposed locating holes 130 made in collar part 126. Once in its intended indexed position, the collar is locked by being held in sandwich between the rib 19' of bearing support 1', and the adjacent edge of the bottom bracket 3. The bearing support 1' can be screwed or unscrewed by means of a suitable tool inserted into located diametrically-opposed locating holes 132.

The arrangement of FIGS. 5 and 6 enables the use of a bearing 21', which is of smaller diameter than the bearing 21 of FIG. 1. Thus, the bearing for the chain ring support is less expensive in this embodiment. Also, the washer 18 and the spring-loaded pin 20 of the first embodiment are eliminated.

FIGS. 7 and 8 show another embodiment in which there are two excentric collars which can be rotated one with respect to the other, and with this embodiment not only is the orientation of the plane containing the two axes A and B adjustable, but also the excentricity is adjustable, that is the spacing between the two axes is adjustable.

The embodiment of FIGS. 7 and 8 is used in association with the crank set of FIG. 1, as was the case for the embodiment of FIGS. 5 and 6. FIG. 7 shows the two bearings 4 and 5 for rotatably supporting the crank shaft 6 with the crank arms 7 and 15 and the transfer arm 11, as in the first embodiment, the crank shaft 6 rotating about the crank shaft axis A.

Bearings 4 and 5 are held in position by means of the spacer sleeve 3A and the step 134 of the hub 136 as far as bearing 4 is concerned, and by the inner flange 135 of a lock nut 140 as far as bearing 5 is concerned. The lock nut 140 can be easily screwed and unscrewed by means of a manual lever 142. The lock nut 140 is screwed on the threaded end of the hub 136. The hub 136 has at its other end an enlarged head forming an external step 144 adapted to be tightened against the adjacent edge of the bottom bracket 3 upon tightening of the lock nut 140 by lever 142. The head of the hub 136 provides an external circumferential face 146, which is excentric with respect to the crank shaft axis A, having axis C. On this excentric external face 146 is rotatably mounted an excentric collar 148, that is an annular member having an external face 150 which is excentric with respect to the external face 146, the face 150 being concentric with chain ring support axis B. The chain ring support 22 is rotatably mounted about the excentric collar 148 by means of bearing 21', the inner race of which is held between a step 152 of the excentric collar 148 and a lock nut 154.

The orientation of the collar 148 with respect to the hub 136 is obtained by means, for instance, of a flexible cable control operated by a lever accessible to the bicycle rider, such as a cable control used for conventional bicycles brakes and speed ratio shifters. The operating cable itself is shown at 156 fixed within a groove of the excentric collar 148. The collar 148 is retained in adjusted position by means of a spring-loaded ball 158 engaging any selected one of equally spaced peripheral notches 160 made in the face 146 of the hub 136. Adjustment of the rotated position of the hub 136 is obtained after loosening lock nut 140, by means of lever 142 and rotating the hub 136 with lever 142, for instance by temporarily inserting a pin through aligned holes made in inner flange 135 and the adjacent edge of hub 136. Once the desired adjustment of hub 136 is obtained, the lock nut 140 is again screwed against the adjacent edge of bottom bracket 3.

With this arrangement, it is seen that one can adjust the amount of chain ring support eccentricity from 0 to a maximum, supposing the degree of excentricity of the hub 136 is the same as the collar 148. The two excentricities may either fully add up or cancel each other, and therefore the pedaling speed variation can be adjusted from steady pedaling, as with the conventional chain ring, up to a maximum variation. Obviously, if so desired, one can provide oval chain rings to replace the circular chain rings 22A, thus combining the effect of the present invention with the effect of the standard oval chain ring. The combination of single speed variation of the described system with an appropriate oval chain ring will generate a rotational motion including a controlled pedalling speed variation over some sectors and near constant pedalling speed over some other sectors.

I claim:

1. A drive system particularly useful for a foot-operated bicycle, comprising: a support, a pair of oppositely-directed input torque crank arms supported by said support, for rotation about a first axis independently of each other, an eccentric collar rotatably carried by said support, an output torque wheel rotatably carried by said collar for rotation about a second axis spaced from and parallel to said first axis, torque-transferring linkage means connecting each crank arm to said output torque wheel, said eccentric collar rotatably mounted on said support and means to releasably and adjustably lock said eccentric collar in adjusted rotated position, so as to adjust the angular orientation of the plane containing said two axes.

2. A drive system as defined in claim 1, further including an additional excentric collar surrounding and rotatably carried by said first-named excentric collar and directly rotatably carrying said torque wheel and means to releasably and adjustably lock said additional excentric collar relative to said first-named excentric collar.

3. A drive system as defined in claim 2, wherein the two eccentric collars have the same eccentricity.

4. A drive system particularly useful for a foot-operated bicycle, comprising a support, a shaft rotatably mounted in said support for rotation about a first axis, a first input torque crank arm fixed to one end of said shaft, a second input torque crank arm freely rotatably mounted about the other end of said shaft, a transfer arm fixed to said shaft adjacent said second crank arm, an eccentric collar rotatably supported by said support and surrounding said shaft, an output torque wheel rotatably supported by said collar for rotation about a second axis spaced from and parallel to said first axis, links pivotally connecting said transfer arm and said second crank arm to said output torque wheel, and means to releasably and adjustably lock said eccentric collar against rotation in adjusted rotated position.

5. A drive system as defined in claim 4, wherein said means to releasably lock said eccentric collar includes a plurality of indexing holes made in said eccentric collar and disposed in a circle co-axial with said first axis and a spring-biased plunger carried by said support and releasably, selectively engageable into any one of said indexing holes.

6. A drive system as defined in claim 4, further including an additional excentric collar surrounding and rotatably carried by said first-named excentric collar and directly rotatably carrying said torque wheel and means to releasably and adjustably lock said additional excentric collar relative to said first-named excentric collar.

7. A drive system as defined in claim 6, wherein the two eccentric collars have the same eccentricity.

* * * * *